United States Patent [19]

Kracklauer

[11] 3,911,049

[45] Oct. 7, 1975

[54] PREPARATION OF B-STAGE UNSATURATED POLYESTER RESINS

[75] Inventor: John J. Kracklauer, Boulder, Colo.

[73] Assignee: Syntex (U.S.A.) Inc., Palo Alto, Calif.

[22] Filed: Mar. 6, 1972

[21] Appl. No.: 232,264

[52] U.S. Cl............................. 260/863; 252/431 R
[51] Int. Cl.².......................................... C08L 67/06
[58] Field of Search..................................... 260/863

[56] References Cited
UNITED STATES PATENTS

| | | | |
|---|---|---|---|
| 3,242,112 | 3/1966 | Renner et al. | 260/23.7 |
| 3,594,439 | 7/1971 | Baker | 260/863 |

FOREIGN PATENTS OR APPLICATIONS

| | | |
|---|---|---|
| 1,241,109 | 3/1967 | Germany |

OTHER PUBLICATIONS

Chem. Abstracts, 70, 48154a (1969).

Primary Examiner—Howard E. Schain
Assistant Examiner—E. A. Nielsen
Attorney, Agent, or Firm—Lawrence S. Squires; Walter H. Dreger; William B. Walker

[57] ABSTRACT

A novel catalyst system is provided useful for the preparation of B-stage unsaturated polyester resins having, as the essential components, a peroxide catalyst and a ferrocene derivative in certain critical ratios. Incorporation of a temperature responsive peroxide catalyst provides later cure of the resin. The product B-stage resins offer the advantages of improved molding characteristics.

7 Claims, No Drawings

PREPARATION OF B-STAGE UNSATURATED POLYESTER RESINS

The present invention is directed to B-stage polyester resin formulations. In particular, the present invention is directed to a novel catalyst system useful for the preparation of B-stage molding compositions from unsaturated polyester resins and to the resins thus prepared.

The B-stage in a resin formulation represents an intermediate stage in the copolymerization or cure whereby the resin is rendered attractively moldable. Thus, thermosetting resins placed in the B-stage cure can be molded to desired shapes with the use of forms, e.g. an automobile grill template, and conveniently cured by simple application of heat and pressure for a prescribed period of time. The advantages of this system permit resin formulators to ship resin product in stable, cohesive sheet or bulk form to manufacturers for convenient, "local" molding and setting to rigid final product.

The use of B-stage technology has been described with phenolic, epoxy and diallyl phthalate resins. Unsaturated polyester resin formulations have relied on the use of physical thickening agents — see, for example, U.S. Pat. No. 3,431,320. Although generally considered superior, this use of B-stage technology has suffered from the disadvantages of often being difficult to consistently control, with the resin curing beyond the B-stage before molding or formulating and setting can efficiently proceed. This is a specific disadvantage. For example, Kleinert et al. in *Plaste and Kautschuk*, 16(1), 50 (1969) in wanting such cured (thoroughly cross-linked) polyester resins employed dibenzoylperoxide and dicyclopentadienyl iron initially in low ratios. However, they used gradually increasing ratios of up to 160:1 in the same cure system (batch) in order to achieve the totally cured product.

The present invention provides a novel catalyst system applicable to unsaturated polyester resins and useful for the preparation of B-stage molding compositions thereof having the characteristics of predictable, practical intermediate stage cure, long stability in the intermediate stage, and convenient thermo-setting properties. The present invention is further directed to a process useful for preparing such compositions and to the compositions thus prepared.

The present invention is thus directed to a catalyst composition useful for preparing a B-stage unsaturated polyester resin which comprises a peroxide compound selected from acyl, peroxy ester, and ketone peroxides and a dicyclopentadienyl iron compound selected from dicyclopentadienyl iron and the alkyl and acyl substituted derivatives thereof; said peroxide compound being present in amounts of less than about 20 parts per part of dicyclopentadienyl iron compound by weight.

The present invention is further directed to a composition suitable for preparing a B-stage unsaturated polyester resin which comprises an unsaturated polyester resin, a peroxide compound selected from acyl, peroxy ester, and ketone peroxides, and a dicyclopentadienyl iron compound selected from dicyclopentadienyl iron and the alkyl and acyl substituted derivatives thereof; said peroxide compound being present in amounts of less than about 20 parts per part of dicyclopentadienyl iron compound by weight.

The present invention is further directed to a method useful for preparing B-stage unsaturated polyester resins utilizing the compositions, as above described and defined.

The present invention is further directed to the compositions above-defined containing, in addition, a thermo-setting catalyst in an amount sufficient to effect cure of the polyester resin.

The present invention is further directed to a B-stage unsaturated polyester resin prepared by means of the catalyst composition and the composition suitable for preparing such, as defined above.

The present invention is further directed to the resin above defined containing, in addition, a thermo-setting catalyst in an amount sufficient to effect cure of said resin.

The B-stage polyester resins of the present invention find wide spread useage based upon their convenient stability, moldability, and setting characteristics. These resins are often reinforced with glass fibers and prepared in sheet form — i.e. SMC or sheet molding compositions. Equipment suitable for producing SMC has been devised and consists of devices for feeding the B-stage resin system, as defined herein, and suitably chopped glass fibers, between two polyethylene sheets, compacting the material between the sheets, and winding the compact product on rolls.

The SMC material in sheets or rolls is conveniently cut to a desired shape and size and placed in a mold where it can be compression molded into rigid product.

Compression molded products are being used in increasing amounts for, e.g. transportation containers, appliances, electrical devices, automobile parts, and so forth.

The B-stage resins hereof can be modified, if desired, with common compounding ingredients which improve various physical characteristics, such as fillers, release agents, pigments and, as discussed above, reinforcing fibers.

Unsaturated polyester resins, as useful herein, are well-known in the art — see, for example, U.S. Pat. No. 2,255,313 — and refer to the poly condensation products of dicarboxylic acids or anhydrides with polyhydric alcohols, optionally modified in the poly condensation reaction mixture by the presence of monocarboxylic acid, monohydroxy alcohol, dihydroxy alcohol, and polycarboxylic acid and admixed with an ethylenically unsaturated monomer capable of copolymerizing with the unsaturated polyester.

Useful, known condensation products include those of alcohols, such as ethylene glycol, diethylene glycol, triethylene glycol, trimethylene glycol, polypropylene glycol, butanediols, propanediols, glycerol, bisphenol-A glycols, and the like, with unsaturated dicarboxylic acids, such as maleic, fumaric, itaconic, and citraconic acid, optionally in the presence of saturated dicarboxylic acids, such as succinic, adipic, sebacic, phthalic, azelaic, tetrahydrophthalic, endomethylenetetrahydrophthalic, and hexachloroendomethylenetetrahydrophthalic acid.

Useful, known unsaturated monomers in the polyester art include styrene, vinyltoluene, divinylbenzene, methyl acrylate, ethyl acrylate, methyl methacrylate, acrolein, diallyl ester of endomethylenetetrahydrophthalic anhydride, ethylene glycol dimethyl acrylate, acrylonitrile, vinylacetate, diallylphthalate, vinyl phenols, diallyl maleate, triallyl cyanurate, and the like.

Useful peroxide compounds selected from acyl, peroxy ester, and ketone peroxides are known in the art. Thus, suitable acyl peroxides include dibenzoyl peroxide, di-(4-chlorobenzoyl) peroxide, di-(2,4-dichlorobenzoyl) peroxide, dilauroyl peroxide, and the like. Suitable peroxy ester peroxides include t-butylperoxybenzoate, t-butylperoxy-2-ethylhexanoate, t-butylperoxyisobutyrate, 2,5-dimethyl-2,5-di(benzoylperoxy)-hexane, 2,5-dimethyl-2,5-di(2-ethylhexanoylperoxy)-hexane, and the like. Suitable ketone peroxides include methyl ethyl ketone peroxide, cyclohexanone peroxide, and the like.

Useful dicyclopentadienyl iron compounds include dicyclopentadienyl iron (ferrocene), ethyl ferrocene, diethyl ferrocene, n-butyl ferrocene, di-n-butyl ferrocene, acetyl ferrocene, butyryl ferrocene, benzoyl ferrocene, and the like. Ferrocene is preferred.

Useful thermo-setting catalyst compounds hereof include organic peroxides and alkyldiazo compounds, known in the art as radical initiators. Suitable such compounds herein include di-t-butylperoxide, n-butyl-4,4-bis(t-butylperoxy)valerate, dicumylperoxide, 2,5-dimethyl-2,5-bis(t-butylperoxy)hexane, 2,2'-azobis(isobutyronitrile), 2,2-bis(t-butylperoxy)butane, and the like, preferably, di-t-butylperoxide. These catalysts are inactive at room temperature to facilitate preparation of the B-stage resin before compression molding cure is desired. The cure may also be effected by appropriate UV light or radiation.

The peroxide compound hereof (acyl, peroxy ester, and ketone peroxide) is employed with the dicyclopentadienyl iron compound in certain preferred ratios. In general, amounts by weight of from about 1 part to about 20 parts of peroxide compound per part of dicyclopentadienyl iron compound are useful. Amounts less than 1 part and greater than 20 parts can be employed depending upon the reactivity of the polyester resin employed and/or if less precise B-stage preparation is adequate. Thus, amounts of from about 0.5 to about 50 parts, by weight, of peroxide per part of dicyclopentadienyl iron can be employed and are included within the scope hereof. Ratios of less than about 20:1 by weight of peroxide compound to dicyclopentadienyl iron compound are preferred herein. Particularly preferred are amounts by weight of from about 3 parts to about 10 parts of peroxide compound per part of dicyclopentadienyl iron compound.

The method hereof wherein B-stage compositions are prepared proceeds, with the novel compositions hereof, at temperatures of from about 10° to about 150°C, conveniently room temperature, and for a period of time ranging from about 5 minutes to about 3 days.

The composition of the present invention, i.e. the catalyst composition with or without incorporated thermo-setting catalyst, when formulated with unsaturated polyester resin; is employed therein in amounts ranging from about 0.05 to about 2.0 percent, preferably from about 0.1 to about 0.3 percent, by weight based upon the total resin.

The thermo-setting catalyst compounds provide total cure of the resin by elevated temperature compression molding activation of the B-staged compositions at temperatures of from about 100° to about 200°C and pressures of from about 200 psi to about 2,000 psi. The thermo-setting catalyst compound is employed in amounts sufficient to effect the cure of the resin ranging from about 0.5 to about 1.0 percent, preferably from about 0.1 to about 0.2 percent, by weight, based upon the total resin.

The compositions and methods of the present invention effect the copolymerization of the unsaturated polyester polymer and copolymerizable monomer, i.e. the unsaturated polymer resin, only to an intermediate or B-stage, suitable for molding and the second, thermo-setting catalyst effects the complete copolymerization or cure of the resin when desired after molding, as described above.

The following examples serve to further illustrate the present invention.

EXAMPLE 1

A commercially available unsaturated polyester sold under the trademark Rohm and Haas P–43 resin (90 grams), 10 g. of styrene monomer, 0.25 g. of dibenzoylperoxide, 1.0 g. of di-t-butylperoxide, and 0.03 g. dicyclopentadienyl iron are mixed together at room temperature and, after mixing, gel to form a flexible cohesive B-stage composition within 30 minutes.

EXAMPLE 2

Five days after the composition of Example 1 is prepared it is still in the flexible B-stage. The composition is then heated at 150°C for 1 hour to give a completely cured, rigid product.

EXAMPLE 3

Unsaturated polyester resin sold under the trademark (Rohm and Haas P–43 resin) (90 grams), 10 g. of styrene monomer, 1.5 g. of dibenzoylperoxide, and 0.06 g. of dicyclopentadienyl iron produce, when mixed at room temperature, a B-stage composition within two hours. This composition does not cure when subjected to temperatures of 150°C for 15 minutes.

Observation of the above composition 7½ and 16 months subsequent to the above preparation demonstrate no significant change in the flexible, B-stage characteristics.

EXAMPLE 4

A blend of 85 percent of a commercially available unsaturated polyester sold under the trademark Koppers No. 1000-25 resin with 15 percent styrene monomer is prepared and divided into two portions. The portions are mixed with the components illustrated in the following table and under the conditions listed therein to give sheets which are evaluated as to flexibility characteristics, as follows:

| Portion | % Dibenzoyl Peroxide | % Dicyclopentadienyl Iron | % Di-t-butyl Peroxide |
|---|---|---|---|
| 1 | 0.50 | 0.005 | 1.0 |
| 2 | 0.50 | 0.025 | 1.0 |

| Time to Thicken at 28°C, min. | Maximum Exotherm Temperature, °C | Time to Maximum Temp., min. | Flexibility |
|---|---|---|---|
| 18 | 42.5 | 90 | firm |
| 22.5 | 62 | 65 | soft |

EXAMPLE 5

A blend of 85 percent of a commercially available unsaturated polyester sold under the trademark Reichhold No. 31-007 resin with 15 percent styrene monomer is divided into three portions each of which is mixed with the components as illustrated in the following table. The sheet mixtures are then heated for a period of time, as illustrated, and then tested for penetration characteristics, as follows:

| Portion | % Dibenzoyl Peroxide | % Dicyclopentadienyl Iron | % Di-t-butyl Peroxide |
|---|---|---|---|
| 1 | 0.35 | 0.03 | 0.1 |
| 2 | 0.35 | 0.03 | 0.1 |
| 3 | 0.50 | 0.03 | 0.1 |

| Temperature, °C | Time at Temperature | Penetration*, Percent (%), After Indicated Thermal History |
|---|---|---|
| 100 | 30 min. | 100 |
| 25 | 24 hours | 42 |
| 100 | 30 min. | 50 |

*Penetration is expressed as percent of ca. 6 mm. sample thickness as measured with a standard precision penetrometer fitted with a miniature grease cone and a 135 g. weight.

EXAMPLE 6

The five sheet compositions described in Examples 4 and 5 are heated at 150°C and under pressure for a period of 30 minutes to give cured, rigid polyester resin sheet compositions.

EXAMPLE 7

The following unsaturated polyester resin composition is prepared by physical mixing of the components at room temperature:

| Component | Parts, by weight | Function |
|---|---|---|
| Reichhold No. 31-039 | 100 | resin |
| zinc stearate | 2 | mold release |
| calcium carbonate | 100 | filler |
| dicyclopentadienyl iron | 0.055 | novel catalyst composition |
| dibenzoylperoxide | 0.3 | |
| 2,2'-azobis(isobutyronitrile) | 0.1 | cure catalyst |

Seventy percent of the above composition is added to 30 percent of 1 inch chopped fiber glass. The resultant product being formulated as a sheet, is placed between polyethylene layers and kneaded.

The above formulation is heated at 75°C for 15 minutes to give a flexible, B-stage composition exhibiting a percent penetration value of 25 (see Example 5).

EXAMPLE 8

The B-stage composition of Example 7 is molded in a press having a 223 in.² surface and designed for matched metal die molding SMC to finished polyester parts. The molding is conducted as follows:

| Test | Mold Pressure | Cure Cycle at 250°C, sec. | Hardness of Finished Product * | Mold Flow |
|---|---|---|---|---|
| 1 | 900 psi | 35 | 35 | complete |
| 2 | 450 psi | 105 | 40 | complete |

* Hardness is expressed as Barcocol hardness as measured by the Barocol impressor (Model No. GYZJ934-1).

EXAMPLE 9

Unsaturated polyester sold under the trademark Reichhold No. 31-007 resin (50 grams), containing 0.2 percent methyl ethyl ketone peroxide, 0.03 percent dicyclopentadienyl iron, and 0.1 percent di-t-butyl peroxide, when mixed, produces a flexible, B-stage molding composition after 30 minutes at 100°C.

Unsaturated polyester sold under the trademark Reichhold No. 31-007 resin (50 grams), containing 0.15 percent methyl ethyl ketone peroxide, 0.03 percent dicyclopentadienyl iron, and 0.1 percent di-t-butylperoxide, when mixed, produces a flexible, B-stage molding composition after 30 minutes at 100°C.

EXAMPLE 10

B-stage unsaturated polyester molding compositions are prepared, molded and cured to rigid polyester products as illustrated by the following table:

| Test | % Methyl Ethyl Ketone Peroxide | % Dibenzoyl Peroxide | % Dicyclopentadienyl Iron |
|---|---|---|---|
| 1 | 0.3 | 0.06 | 0.03 |
| 2 | 0.15 | 0.06 | 0.03 |

| % Di-t-butyl Peroxide | Penetration[1], Percent (%), at B-stage | Hardness[2] at Cure |
|---|---|---|
| 0.2 | 10 | 35 |
| 0.1 | 100 | 30 |

[1]See Example 5
[2]See Example 8

The above tests employed a 110°C temperature for 30 minutes for the preparation of B-stage and 150°C for 30 minutes for the cure of B-stage.

EXAMPLE 11

The procedures of Examples 1, 3 to 5, 7, 9, and 10 are repeated using each of commercially available unsaturated polyesters sold under the trademark Koppers No. 3701-25 and Diamond No. 6395 resins, with similar results.

EXAMPLE 12

The procedures of Examples 1 to 11 are repeated using each of the following peroxide catalysts with the dicyclopentadienyl iron, with similar results:
di(4-chlorobenzoyl)peroxide,
di(2,4-dichlorobenzoyl)peroxide,
dilauroyl peroxide,
cyclohexanone peroxide,
methyl ethyl ketone peroxides,
t-butylperoxybenzoate,
t-butylperoxy 2-ethylhexanoate,
t-butylperoxyisobutyrate,
2,5-dimethyl-2,5-di(benzoylperoxy)hexane, and
2,5-dimethyl-2,5-di(2-ethylhexanoylperoxy)hexane.

EXAMPLE 13

The procedures of Examples 2, 6 and 8 are repeated using each of n-butyl-4,4-bis(t-butylperoxy)valerate, dicumyl peroxide, 2,2-bis(t-butylperoxy)butane, and 2,5-dimethyl-2,5-bis(t-butylperoxy)hexane as cure catalysts, with similar results.

EXAMPLE 14

The procedures of Examples 1, 3 to 5, 7, 9, and 10 are repeated using each of ethyl-, diethyl-, n-butyl-, di-n-butyl-, acetyl-, butyryl-, and benzoyl-ferrocene, in lieu of ferrocene, with similar results.

What is claimed is:

1. A method of preparing a stable B-stage thermosetting polyester resin which comprises the steps of:
    a. Admixing a composition comprising
        1. an unsaturated carboxylic polyester resin, comprising a polycondensation product of a dicarboxylic acid or anhydride with a polyhydric alcohol admixed with an ethylenically unsaturated monomer capable of co-polymerizing said unsaturated carboxylic polyester;
        2. a dicyclopentadienyl iron compound selected from the group consisting of ferrocene, ethylferrocene, diethylferrocene, N-butylferrocene, di-n-butylferrocene, acetylferrocene, butyrylferrocene, benzoylferrocene;
        3. a peroxide compound selected from the group consisting of dibenzoyl peroxide, di-(4-chlorobenzoyl) peroxide, di-(2,4-dichlorobenzoyl) peroxide, dilauroyl peroxide, t-butylperoxy 2-ethylhexanoate, t-butylperoxy isobutyrate, 2,5-dimethyl-2,5-di(benzoylperoxy)-hexane, 2,5-dimethyl-2,5-di(2-ethylhexanoylperoxy)-hexane, methylethyl ketone peroxide and cyclohexanone peroxide, and wherein said peroxide compound is provided in amounts of less than about 20 parts, by wt., per part of said dicyclopentadiene iron compound;
        4. a thermosetting catalyst selected from the group consisting of di-t-butylperoxide, n-butyl-4,4-bis(t-butylperoxy)valerate, dicumylperoxide, 2,5-dimethyl-2,5-bis(t-butylperoxy)hexane, 2,2'-azobis(isobutyronitrile), and 2,2-bis(t-butylperoxy)butane and wherein said thermosetting catalyst is provided in a quantity ranging about from 0.5 to 1 percent, by wt., of the total weight of said composition and
    b. Aging the composition of step a) at temperatures in the range of about from 10° to 150°C for about from 5 minutes to 3 days to effect B-stage cure of said composition.

2. The stable B-stage product of the process of claim 1.

3. The process according to claim 1 wherein said peroxide compound and said dicyclopentadienyl compound are present in an amount ranging from about 0.1 to about 0.3 percent by weight of the total composition.

4. The process according to claim 3 wherein said peroxide compound is dibenzoylperoxide and said dicyclopentadienyl iron compound is dicyclopentadienyl iron.

5. The process according to claim 4 wherein said dibenzoylperoxide is present in amounts ranging from about 3 to about 10 parts per part of said dicyclopentadienyl iron by weight.

6. The process according to claim 5 wherein said thermo-setting catalyst is selected from 2,2'-azobis(isobutyronitrile), di-t-butylperoxide, and 2,2-bis(t-butylperoxy)butane.

7. The stable product of the process of claim 6.

* * * * *

UNITED STATES PATENT AND TRADEMARK OFFICE
CERTIFICATE OF CORRECTION

PATENT NO. : 3,911,049

DATED : October 7, 1975

INVENTOR(S) : JOHN J. KRACKLAUER

It is certified that error appears in the above-identified patent and that said Letters Patent are hereby corrected as shown below:

Column 4, line 1, "about 0.5 to about 1.0 percent" should read -- about 0.05 to about 1.0 percent --.

Column 8, line 11, "from 0.5 to 1%" should read -- from 0.05 to 1% --.

Signed and Sealed this thirtieth Day of March 1976

[SEAL]

Attest:

RUTH C. MASON
*Attesting Officer*

C. MARSHALL DANN
*Commissioner of Patents and Trademarks*